(12) United States Patent
Shoki

(10) Patent No.: US 6,308,085 B1
(45) Date of Patent: Oct. 23, 2001

(54) DISTRIBUTED ANTENNA SYSTEM AND METHOD OF CONTROLLING THE SAME

(75) Inventor: Hiroki Shoki, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/263,872

(22) Filed: Mar. 8, 1999

(30) Foreign Application Priority Data

Mar. 13, 1998 (JP) .................................................. 10-063233

(51) Int. Cl.⁷ ....................................................... H04B 1/38
(52) U.S. Cl. ........................... 455/562; 455/561; 455/273
(58) Field of Search ..................................... 455/561, 562, 455/277.1, 277.2, 133–136, 273, 278.1; 342/354, 372, 374, 81, 371

(56) References Cited

U.S. PATENT DOCUMENTS

| 5,596,329 | * | 1/1997 | Searle et al. | 342/374 |
| 5,602,555 | * | 2/1997 | Searle et al. | 342/374 |
| 5,621,752 | * | 4/1997 | Antonio et al. | 375/200 |
| 5,666,123 | * | 9/1997 | Chrystie | 342/374 |
| 5,684,491 | * | 11/1997 | Newman et al. | 342/374 |
| 5,867,123 | * | 2/1999 | Geyh et al. | 342/372 |
| 5,907,816 | * | 5/1999 | Newman et al. | 455/562 |
| 5,936,591 | * | 8/1999 | Yamasa et al. | 343/853 |
| 6,061,553 | * | 5/2000 | Matsuoka et al. | 455/273 |

FOREIGN PATENT DOCUMENTS 9-321688    12/1997   (JP) .

* cited by examiner

Primary Examiner—Nay Maung
Assistant Examiner—Sonny Trinh
(74) Attorney, Agent, or Firm—Oblon, Spivak, McClelland, Maier & Neustadt, P.C.

(57) ABSTRACT

The present invention is a distributed antenna system comprising a plurality of antennas arranged in a distributed manner such that individual service areas partly overlap one another, and a centralized controller for controlling the plurality of antennas, wherein the centralized controller comprises a selection circuit for selecting at least one of the plurality of antennas and a beam forming circuit for forming at least one beam by setting desired excitation conditions for the at least one of the plurality of antennas selected.

13 Claims, 7 Drawing Sheets

| | TRANSMITTING ANTENNA UNIT AND EXCITATION DISTRIBUTION (AMPLITUDE ∠ PHASE) | | | | RECEIVING ANTENNA UNIT AND LEVEL OF RECEIVED SIGNAL | | | | |
|---|---|---|---|---|---|---|---|---|---|
| | ANTENNA A | ANTENNA B | ANTENNA C | ANTENNA D | ANTENNA A | ANTENNA B | ANTENNA C | ANTENNA D | |
| 1 | 0dB∠0° | -3dB∠90° | NOT USED | NOT USED | ✕ | ✕ | -10dB | -30dB | ⋮ |
| 2 | -3dB∠0° | 0dB∠-90° | NOT USED | NOT USED | ✕ | ✕ | -8dB | -33dB | ⋮ |
| 3 | NOT USED | 0dB∠0° | -2dB∠100° | NOT USED | -10dB | ✕ | ✕ | -30dB | ⋮ |
| ⋮ | ⋮ | ⋮ | ⋮ | ⋮ | ⋮ | ⋮ | ⋮ | ⋮ | |

FIG. 10

| | | RECEIVING ANTENNA UNIT | | | |
|---|---|---|---|---|---|
| | | ANTENNA A | ANTENNA B | ANTENNA C | ⋯ |
| TRANSMITTING ANTENNA UNIT | ANTENNA A | ✕ | -10dB | -20dB | |
| | ANTENNA B | -10dB | ✕ | -30dB | |
| | ANTENNA C | -20dB | -30dB | ✕ | |
| | ⋮ | ⋮ | | | |

FIG. 9

DISTRIBUTED ANTENNA SYSTEM AND METHOD OF CONTROLLING THE SAME

BACKGROUND OF THE INVENTION

The present invention relates generally to a distributed antenna system for use in mobile communications, and more particularly to a distributed antenna system wherein a plurality of antenna units are widely distributed in a service area and controlled by a centralized controller. In addition, the present invention relates to a method of controlling the distributed antenna system.

As a method of constructing base stations for mobile communications with use of cellular phones, there has been proposed a method wherein a plurality of antenna units each comprising an antenna and a transmission/reception amplifier unit are provided in a communication service area and controlled by a centralized controller in a centralized manner.

FIG. 1 shows a conventional distributed antenna system. In the conventional distributed antenna system, as shown in FIG. 1, antenna units 101, 102 and 103 are distributed and controlled by a centralized controller 100. Cables or optical fibers are used to connect the centralized controller 100 and antenna units 101, 102 and 103. The centralized controller 100 performs such a control that radio frequencies are assigned for information transmission between the antenna unit 101, 102, 103 and terminals 104 in an associated zone Z1, Z2 and Z3, and transmission/reception signals are modulated/demodulated. The processing of signals for the antenna units 101, 102 and 103 is performed independently. With this structure, the control can be effected by the centralized controller 100 in a centralized manner. If a great number of antenna sections are provided, the cost for installation can advantageously be reduced.

In the conventional distributed antenna system, however, no countermeasure has been taken for a multipath, phasing, etc. which are problems at all times in mobile communication of cellular phones, etc. Specifically, in a case where only one antenna unit can be accessed by the terminal side within the service area in the distributed antenna system as shown in FIG. 1, communication may be interrupted on a time-axis due to multi-path, phasing, etc. or shifting of terminals.

As has been described above, in the conventional distributed antenna system, no countermeasure is taken for multi-path or phasing which are problems in mobile communications, and the reliability of communication is low.

BRIEF SUMMARY OF THE INVENTION

The present invention has been made in consideration of the above problems and its object is to provide a distributed antenna system which can maintain excellent communication links in a mobile communication environment in which multi-path or phasing is occurring.

In order to achieve the above object, there is provided a distributed antenna system comprising: a plurality of antenna units arranged in a distributed manner such that individual service areas partly overlap one another; and a centralized controller for controlling the plurality of antenna units. The centralized controller comprises, as basic elements, a selection circuit for selecting at least one of the antenna units, and a beam forming circuit for forming a beam by setting desired excitation conditions for the antenna units selected by the selection circuit.

Necessary antenna units alone are chosen in accordance with the condition at the time of communication, and beams can be efficiently formed toward user terminals such as mobile terminals. In addition, interference wave components can be suppressed. Specifically, if an unnecessary antenna is used, electric waves may be radiated in an undesired direction and a third party may be interfered with. Moreover, if a beam is formed in an undesired direction, unnecessary interference waves may be received. These problems do not arise in this invention. Excellent communication links can be maintained in the mobile communication environment in which multi-path or phasing occurs.

The centralized controller may have a plurality of beam forming circuits and form a plurality of transmission beams or reception beams. Thereby, many user terminals can communicate independently at the same time while the cost is limited to a minimum.

In the centralized controller, the choice of antenna units and the formation of beams are performed independently for transmission and reception. Specifically, the centralized controller comprises: a first selection circuit for selecting at least one of the antenna units; a transmission beam forming circuit for forming a transmission beam by setting desired excitation conditions for the antenna unit selected by the first selection circuit; a second selection circuit for selecting at least one of the antenna units; and a reception beam forming circuit for forming a reception beam by setting desired excitation conditions for the antenna units selected by the second selection circuit.

In the mobile communication, the environment of electric wave propagation varies between transmission and reception due to a difference in time and frequency between transmission and reception. However, according to the present invention, since the transmission beam and reception beam are controlled independently for the communication of the same terminal, thus, transmission and reception communications can be always performed in good condition.

The centralized controller may comprise, in addition to the first and second selection circuits, the transmission beam forming circuit and the reception beam forming circuit, a monitor section for activating the transmission beam forming circuit and the reception beam forming circuit at the same frequency and monitoring a reception level of a signal transmitted from the transmission-side antenna unit, in which the transmission beam is formed, and received by the reception-side antenna unit in which the reception beam is formed.

With the above structure, the individual service areas of the respective antenna units can be recognized even in the condition in which the environment of electric wave propagation varies depending on time periods. Based on the recognition, the practically effective individual service areas can be set and the frequency (channel) arrangement for using the same frequency can be designed with a maximum efficiency of use. Thus, there is a great merit in efficiently using the frequency.

The centralized controller may find and store a mutual coupling amount between the transmission-side antenna unit and the reception-side antenna unit on the basis of the reception level monitored by the monitoring section.

Thereby, the mutual coupling amount and the presence/absence of mutual interference between the antenna units can always be stored. When the frequencies and channels are assigned for actual communication, the same frequency and channel are assigned to, for example, non-interfering two antenna units each other on the basis of the stored data. Thus, the frequencies can be reused and there is a greater advantage in efficiently using the frequency resource. In addition, more user terminals can be accommodated in the communication system in which one centralized controller is used as a base station, and crowded communication can be relaxed. In this case, if the mutual coupling amounts stored in the memory is updated periodically, the optimal frequency assignment can be performed according to the environment of electric wave propagation which varies depending on time periods.

Moreover, using the stored mutual coupling amount between the antenna units, each of the first and second select circuits in the centralized controller may select at least one antenna unit, in which the mutual coupling amount is a predetermined value or less. Thereby, a plurality of antenna groups are formed.

With this structure, the antenna groups can be controlled independently, and coupling between antenna groups can be reduced. If each antenna group is operated at the same frequency, different beams can be formed at the same frequency and isolation between beams can be ensured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 shows a mutual coupling amount between a transmitting antenna units and receiving antenna units; and FIG. 10 shows a mutual coupling amount between transmitting antenna units and receiving antenna units.

DETAILED DESCRIPTION OF THE INVENTION

Embodiments of the present invention will now be described with reference to the accompanying drawings.
(First Embodiment)

Figure 1:
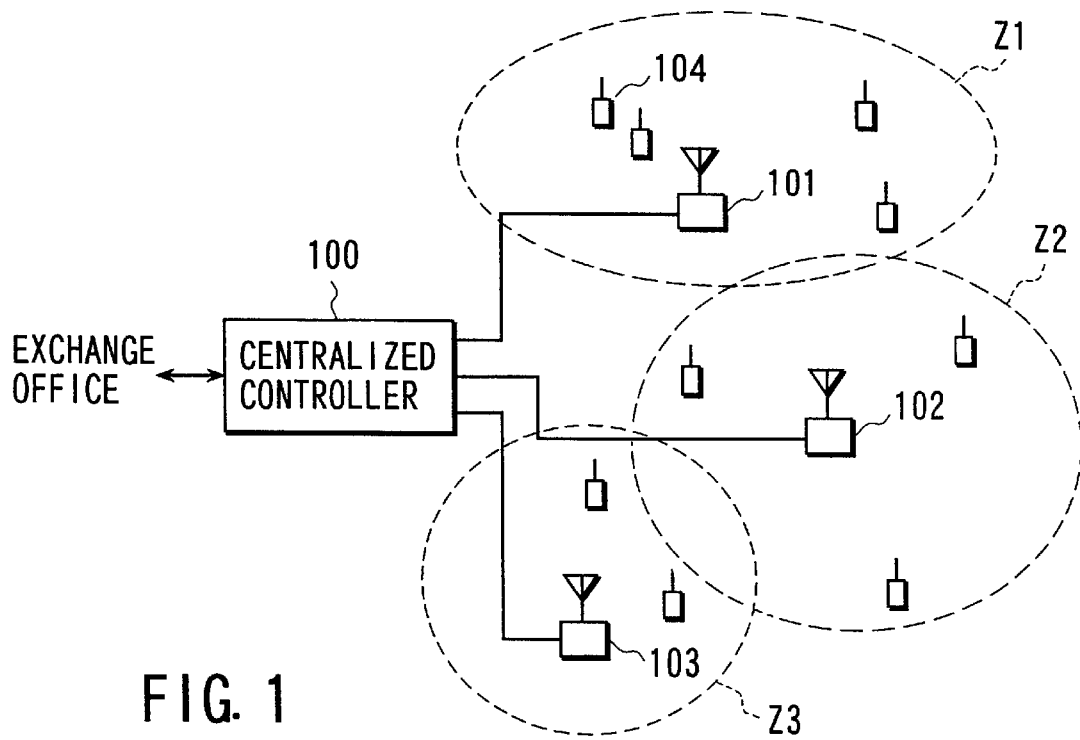
FIG. 1 schematically shows a conventional distributed antenna system.
Figure 2:
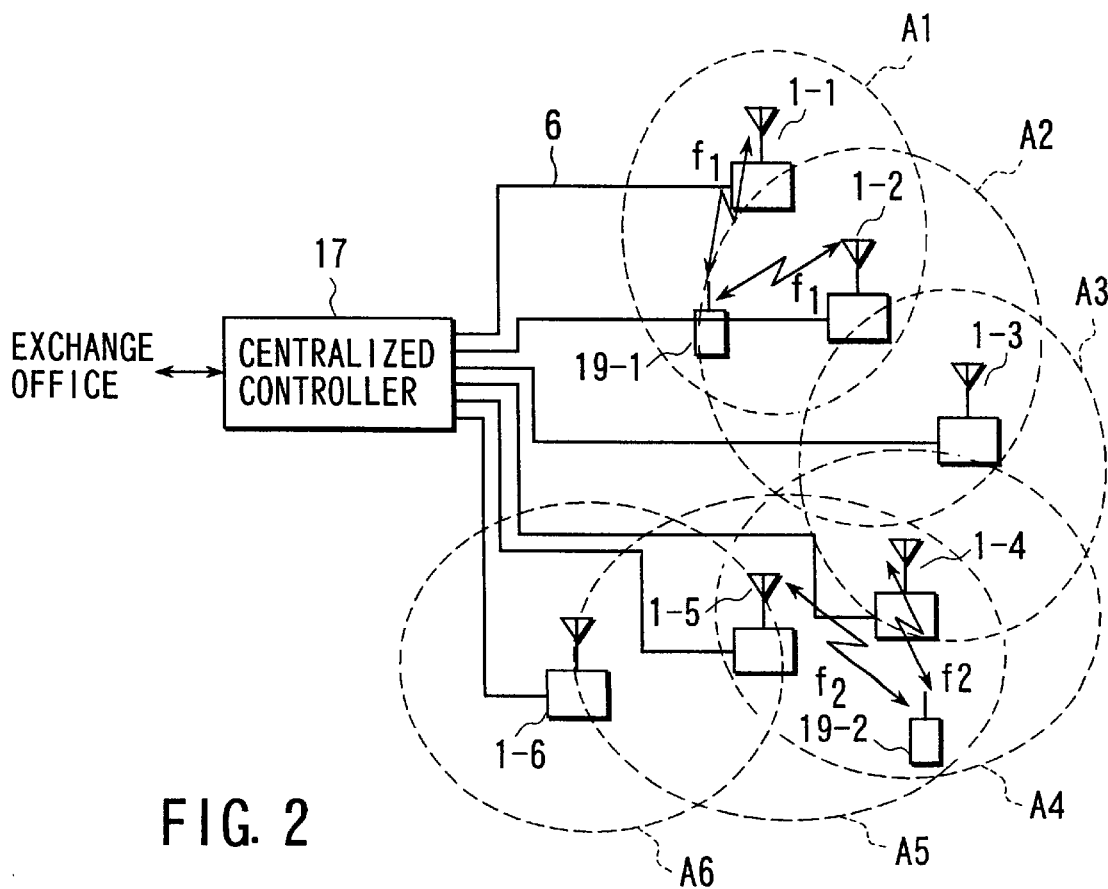
FIG. 2 schematically shows a distributed antenna system according to a first embodiment of the present invention.

FIG. 2 schematically shows a distributed antenna system according to a first embodiment of the present invention. A plurality of antenna units 1-1 to 1-6 are arranged in a distributed manner, that is, independently at spatial intervals from one another. The antenna units 1-1 to 1-6 are controlled by a centralized controller 17. The antenna units 1-1 to 1-6 are connected to the centralized controller 17 over control lines 6.

The control lines 6 serve to transmit signals transmitted or received by the antenna units 1-1 to 1-6, to transmit signals for controlling amplifiers provided within the antenna units 1-1 to 1-6 and, where necessary, frequency converters, A/D converters and D/A converters, and to supply power, etc. The control lines 6 may be constituted by electric cables such as coaxial lines or optical cables (fibers) with photoelectric converters inserted in the antenna units 1-1 to 1-6 and/or centralized controller 17. The transmission of signals over the control lines 6 between the antenna units 1-1 to 1-6 and centralized controller 17 may be effected in a radio-frequency (RF) band, an intermediate frequency (IF) band or a base band (BB).

The antenna units 1-1 to 1-6 are arranged such that the areas covered by these antenna units, that is, areas of radiation of electric waves from the respective antennas or areas of incoming electric waves receivable by the respective antennas (hereinafter referred to as "individual service areas") A1 to A6, overlap partly as shown by broken lines. For example, in FIG. 2, the individual service area A1 of the antenna unit 1-1 partly overlaps the individual service areas A2 and A3 of the antenna units 1-2 and 1-3.

Since the individual service areas A1 to A6 of the antenna units 1-1 to 1-6 overlap partly, terminals 19-1 and 19-2 in the communication service area of the entire distributed antenna system can receive and transmit electric waves with a plurality of antenna units. For example, the terminal 19-1 communicates with the antenna units 1-1 and 1-2 with a common frequency (channel) f1, and the terminal 19-2 communicates with the antenna units 1-4 and 1-5 with a common frequency (channel) f2.

Specifically, since the terminals 19-1 and 19-2 can always communicate with two or more antenna units, communication is not interrupted even if an electric wave path is cut off due to an obstacle, etc., and the reliability of communication can be improved. In addition, as will be described later, the conditions for excitation of the two or more antenna units which can be used at the same time may be controlled so that a variation in electric wave signal intensity due to multi-path or phasing can be coped with by means of diversity. Thus, the advantage in applying this technique to mobile communications is great.

Figure 3:
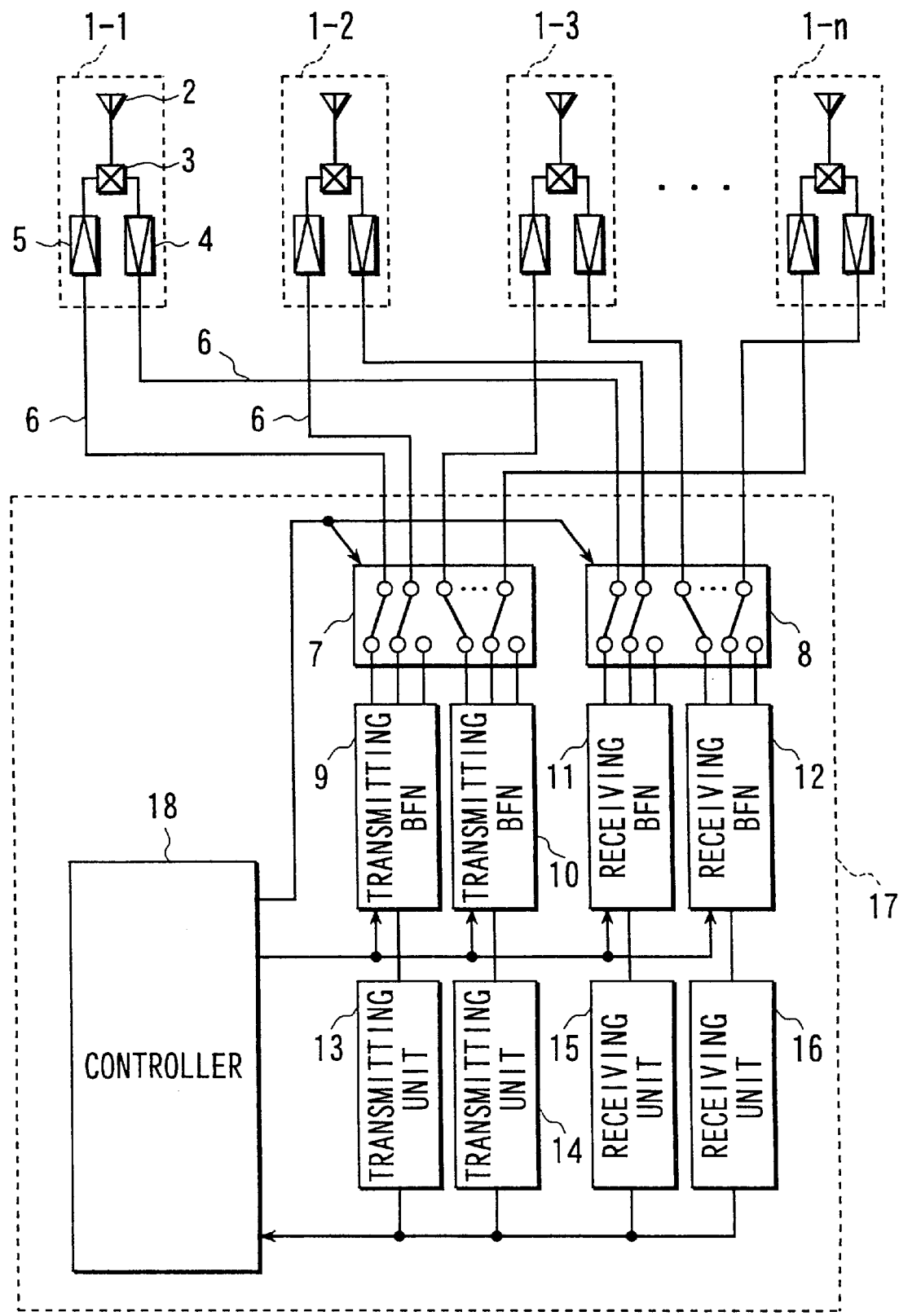
FIG. 3 shows a specific structure of the distributed antenna system according to the first embodiment.

FIG. 3 shows a more specific structure of the distributed antenna system according to the present embodiment.

Each of an n-number of antenna units 1-1 to 1-n includes an antenna 2, a transmission/reception switch 3, a receiving amplifier 4 and a transmitting amplifier 5. These elements are structurally integrated. The antenna units 1-1 to 1-n are arranged in a distributed manner at spatial intervals from one another, as shown in FIG. 2. The intervals of the antenna units 1-1 to 1-n vary depending on the usable frequency band or transmission rate of the communication system, the size of the communication service area of the entire antenna system, etc. For example, the intervals are set at values between several-ten meters and several-hundred meters. The antenna units 1-1 to 1-n are connected to the centralized controller 17 over lines 6.

In this embodiment, the lines 6 for transmission and those for reception are independently provided. However, with use of switches, etc., lines shared for transmission and reception may be used.

The centralized controller 17 comprises a transmitting switch 7, a receiving switch 8, transmission beam forming circuits (transmitting BFN) 9 and 10, reception beam forming circuits (receiving BFN) 11 and 12, transmitting units 13 and 14, receiving units 15 and 16, ad a controller 18. The operations of the centralized controller 17 at the time of reception and transmission will now be described.

At the time of reception, at first, signals transmitted from the antenna units 1-1 to 1-n are input as reception signals to the receiving switch 8. A predetermined number of antenna units, which are associated with the beam formation, are selected by the receiving switch 8. Signals transmitted from the selected antenna units are transmitted to a plurality of reception beam formation circuits 11 and 12.

The reception beam formation circuits 11 and 12 set proper excitation conditions for the antenna units selected by the receiving switch 8. The excitation conditions are an excitation amplitude and an excitation phase at the time of reception, and the amplitude and phase of reception signals are weighted under such conditions. With such conditions, such functions as those for forming a specific reception beam pattern or steering a reception beam in a specific direction or functions of change-over diversity and synthesis diversity as countermeasures for phasing can be provided with respect to the outputs of the reception beam formation circuits 11 and 12.

The outputs from the reception beam formation circuits 11 and 12 are delivered to the receiving units 15 and 16. The receiving units 15 and 16 synchronize, demodulate, detect and decode the reception signals.

On the other hand, at the time of transmission, transmission signals output from the transmitting units 13 and 14 are input to the transmission beam formation circuits 9 and 10, and the excitation conditions for certain antenna units are set. Then, the transmitting switch 7 selects a predetermined number of antenna units, and the transmission signals from the transmitting units 13 and 14 are sent to the selected antenna units 9 via the transmission beam formation circuits 9 and 10.

The excitation conditions are an excitation amplitude and an excitation phase at the time of transmission, and the amplitude and phase of transmission signals are weighted under such conditions. With such conditions, the selected antenna units can be provided with such functions as those for forming a specific transmission beam pattern or steering a transmission beam in a specific direction or functions of change-over diversity and synthesis diversity as countermeasures for phasing.

The inside of the centralized controller 17 is controlled by the controller 18. Specifically, on the basis of the information of signals received by the receiving units 15 and 16 and the information of signals transmitted from the transmitting units 13 and 14, the controller 18 controls the setting of the excitation conditions for the transmission beam formation circuits 9 and 10 and the receiving beam formation circuits 11 and 12 as well as the setting of the antenna units to be selected by the transmitting switch 7 and receiving switch 8.

Examples of specific structures of the transmission beam formation circuit 9, 10 and the reception beam formation circuit 11, 12 will now be described with reference to FIGS. 4A and 4B.

Figure 4A:
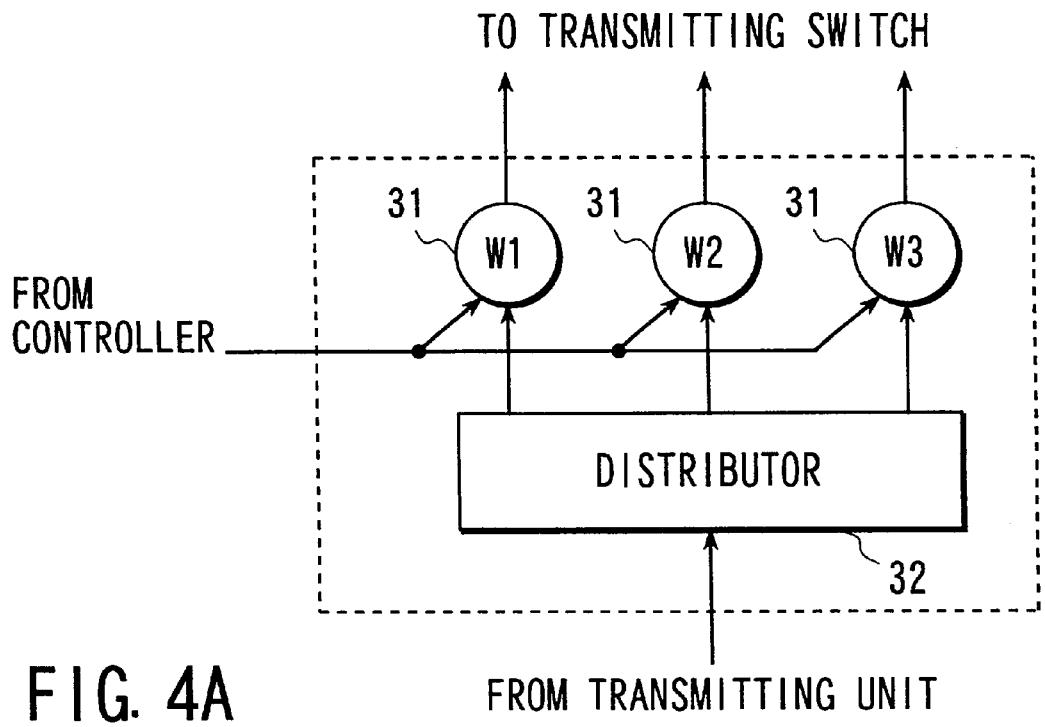
FIG. 4A shows a transmission beam formation circuit in the first embodiment.

In the transmission beam formation circuit shown in FIG. 4A, a transmission signal from the transmission unit 13 or 14 is distributed by a distributor 32 to a plurality of weighting devices 31 for weighting of amplitude and phase. The weighting of amplitude and phase in this context is an alteration of amplitude and phase components of signals.

Figure 4B:
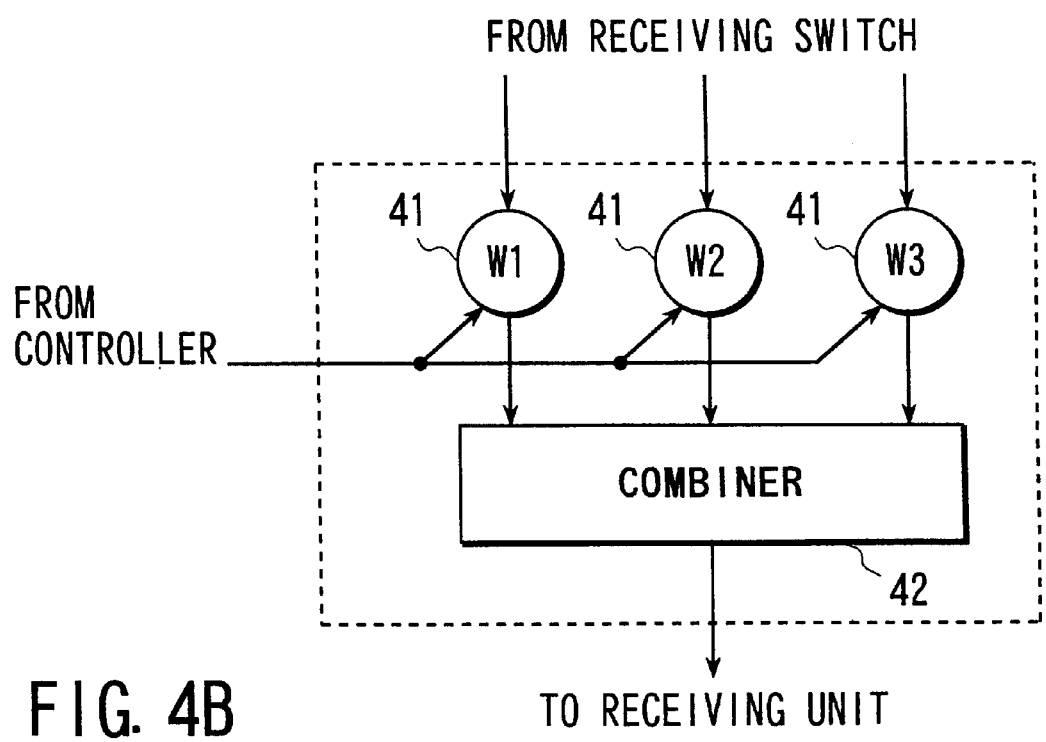
FIG. 4B shows a reception beam formation circuit in the first embodiment.

On the other hand, in the reception beam formation circuit shown in FIG. 4B, a reception signal from the receiving switch 8 is similarly input to a plurality of weighting devices 41 for weighting of amplitude and phase. The outputs from the weighting devices 41 are synthesized by an combiner 42. The amounts of weighting at the weighting devices 31 and 41 are controlled by the controller 18 shown in FIG. 3.

In a case where the transmission/reception beam formation circuits 9, 10, 11 and 12 are digital signal processing circuits, the weighting devices 31 and 42 can be easily realized by arithmetic processes. In a case where the transmission/reception beam formation circuits 9, 10, 11 and 12 are analog signal processing circuits, the weighting in amplitude can be effected by using variable gain circuits such as variable attenuators or variable amplifiers and the weighting in phase can be effected by using variable phase shifters.

According to the above embodiments, the following advantages can be obtained.

(1) At the time of transmission/reception of the centralized controller 17, one or more antenna units chosen from among the antenna units 1-1 to 1-n are selected by the transmitting switch 7 and reception switch 8, and arbitrary conditions for excitation are set for the selected antenna units.

It is thus possible to select only necessary antenna units according to the condition at the time of communication and to perform most efficient beam formation for the communication counterparts such as terminals. Specifically, it is possible to steer the direction of beam toward the user terminal and to form a beam pattern to suppress interference wave components. This embodiment is effective, in particular, for the base station antenna system of mobile communications.

(2) In the conventional system in which all antennas are used, as a result, electric waves are radiated in a non-associated direction, and a third party is interfered with, or a beam is formed in a non-associated direction and unnecessary interference waves are received since unnecessary antennas are used. According to the present invention, however, necessary antenna units alone are used for transmission/reception and these problems are solved. In addition, great advantages are obtained for the anti-interference measures, for the base station unit and for the entire system.

(3) Since a plurality of beam forming circuits are provided in the single centralized controller 17, a plurality of independent beams can be formed at a time. Even if an independent control is performed for many user terminals, the cost will not increase and this technique is practical.

(4) Since the transmission beam formation circuits 9, 10 and the reception beam formation circuits 11 and 12 are independently provided, even if communication is performed with the same user terminal, the transmission beam and reception beam can be controlled independently. In the case of mobile communications, a time difference or a frequency difference normally occurs in transmission and reception. Accordingly, the environment for propagation of electric waves differs between transmission and reception in most cases. Even in such cases, good communications can be realized.

In the present embodiment, in each of the antenna units 1-1 to 1-n, the antenna 2 is shared for transmission and reception by means of the transmission/reception switch 3. However, the transmission/reception switch 3 may be replaced with a circulator. In a case where different frequency bands are used for transmission and reception, the transmission and reception signals may be separated by using a diplexer (duplexer) or a filter. Moreover, antennas may be prepared separately for transmission and reception and may structurally incorporated in each of the antenna units 1-1 to 1-n.

(Second Embodiment)

Figure 5:
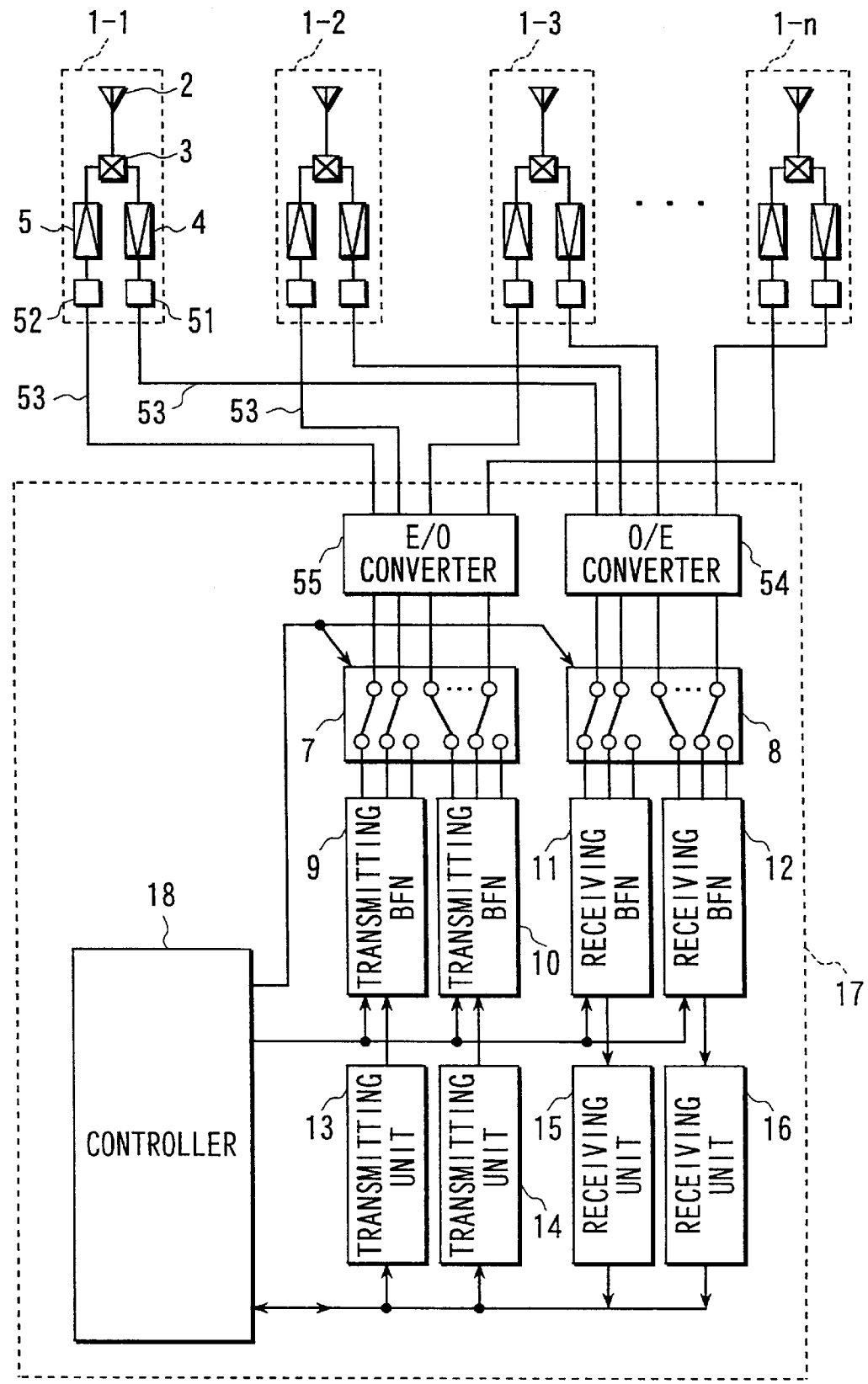
FIG. 5 shows a structure of a distributed antenna system according to a second embodiment of the invention.

FIG. 5 shows a structure of a distributed antenna system according to a second embodiment of the present invention. This embodiment differs from the first embodiment in that signals are transmitted between the antenna units 1-1 to 1-n and the centralized controller 17 by optical transmission.

Specifically, in the present embodiment, each of the antenna units 1-1 to 1-n includes an electro-optical converter (E/O converter) 51, provided on the output side of the receiving amplifier 4, for converting an amplified reception signal from the receiving amplifier 4 to an optical signal, and an opto-electronic converter (O/E converter) 52, provided on the input side of the transmitting amplifier 5, for converting an optical signal from the centralized controller 17 to an electric signal.

On the other hand, the centralized controller 17 includes an O/E converter 54, provided on the input side of the receiving switch 8, for converting an optical signal transmitted from the antenna unit, 1-1 to 1-n, to an electric signal, and an E/O converter 55, provided on the output side of the transmitting switch 7, for converting an electric signal to an optical signal and sending the optical signal to the antenna unit, 1-1 to 1-n.

The E/O converter 51 and O/E converter 54 are connected over an optical fiber 53, and the O/E converter 52 and E/O converter 55 are connected by an optical fiber 53.

According to the present embodiment, since optical signal transmission is adopted between the antenna unit, 1-1 to 1-n, and the centralized controller 17, signals can be transmitted at a low loss even in the case where the distance between the antenna unit, 1-1 to 1-n, and the centralized controller 17 is increased, compared to the case where electric cables such as coaxial cables are used.

In the case of using the optical fibers 53, compared to using electric cables, the cost for installing cables is lower and the cost of the entire system can be reduced.

(Third Embodiment)

A distributed antenna system according to a third embodiment of the present invention will now be described with reference to FIG. 6.

The distributed antenna system according to this embodiment is basically the same as that of the first embodiment. A plurality of antenna units 21-26 are arranged in a distributed manner and controlled by a centralized controller 20. The antennas 21 to 26 and the centralized controller 20 are connected over control lines 27.

In the first embodiment, the individual service areas of the antenna units 1-1 to 1-6 are specified in advance. In the present embodiment, on the other hand, the individual service areas of the antenna units 21 to 26 can be set by a control from the centralized controller 20. The specific structure of the distributed antenna system in this case is as shown in FIG. 3. It is necessary, however, that in order to make it possible to set the individual service areas of the antenna units 21 to 26 by a control from the centralized controller 20, each antenna unit be capable of transmitting and receiving signals of the same frequency.

Figure 6:
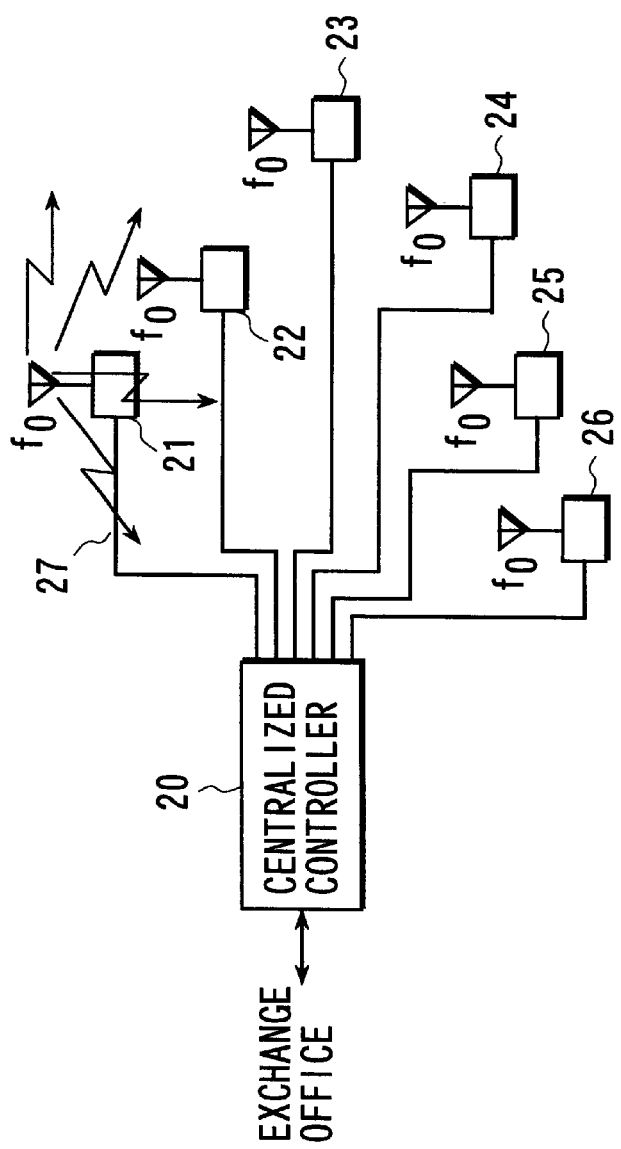
FIG. 6 schematically shows a distributed antenna system according to a third embodiment of the invention.

With this structure, as shown in FIG. 6, the antenna unit 21 can transmit signals at frequency f0 and the other antenna units 22, 23, 24, 25 and 26 can receive signals at frequency f0. The reception intensity of the signal transmitted from the antenna unit 21 can be measured by the other antenna units 22, 23, 24, 25 and 26. Based on the measured intensity, the individual service area of the antenna unit 21 can be specified.

According to the present embodiment, the individual service areas of the antenna units 22 to 26 can be determined by the control from the centralized controller 20. The range of reach of electric waves on a practical level varies depending on parameters such as the influence of reflection by buildings, frequency and polarization. It is thus very difficult to exactly set the individual service areas of the antenna units 22 to 26. In this embodiment, however, the individual service areas can be recognized by actual measurement and there is a great merit in designing the communication service areas of the entire distributed antenna system. In particular, even in a case where the environment of propagation of electric waves varies with the passing of time, the actual measurement of the individual service areas may be performed periodically, thereby improving the design of communication service areas.

The advantage of the present embodiment is conspicuous with respect to the efficient use of frequency resource, too. According to this embodiment, the reception intensity of the signal transmitted from one of the antenna units may be received by some other antenna unit and measured, whereby isolation characteristics of different two antenna units can be understood.

The value of the thus found isolation is compared with a reference value. If this value is equal to or greater than the reference value (in other words, if the mutual coupling amount between two antenna units is the reference value or less), no interference occurs between the two antenna units and the user terminal even if the same frequency is used for communication. Accordingly, the frequency can be used repeatedly. According to the present embodiment, the frequency (channel) arrangement for the use of the same frequency can be designed with a maximum efficiency of use, and the frequencies can be efficiently reused.

Referring to the flow chart of FIG. 7, a specific example of the control procedure in this embodiment will now be described. The control procedure is executed in the centralized controller 20.

The antenna units for transmission is chosen (step S1). The number of antenna units for transmission may be one or more. If two or more antenna units for transmission are used, the excitation conditions (excitation amplitude and excitation phase) for each antenna unit become factors for varying the synthetic directivity of the entire distributed antenna system. Thus these excitation conditions should be clearly understood in advance and stored, where necessary.

A control is then performed to transmit a signal from the chosen antenna unit for transmission at predetermined excitation conditions and frequency (step S2).

The antenna unit for reception is then chosen (step S3). A control is performed to enable the chosen antenna to receive a frequency component transmitted in step S2 (step S4).

The reception level (electric field intensity or power) of the signal received in step S4 is monitored (step S5).

Through the control procedures of steps S1 to S5, the individual service areas of the respective antenna units can be recognized by the control of the centralized controller 20, and the practically effective individual service areas of the respective antenna units can be exactly set. Moreover, even in a case where the environment of electric wave propagation varies depending on time periods, no problem arises if the procedures of steps S1 to S5 are performed periodically. Furthermore, from the standpoint of effective use of frequency resource, too, the frequency (channel) arrangement for reusing the same frequency can be designed with a highest efficiency of use and there is a great merit in this respect.

Figure 7:
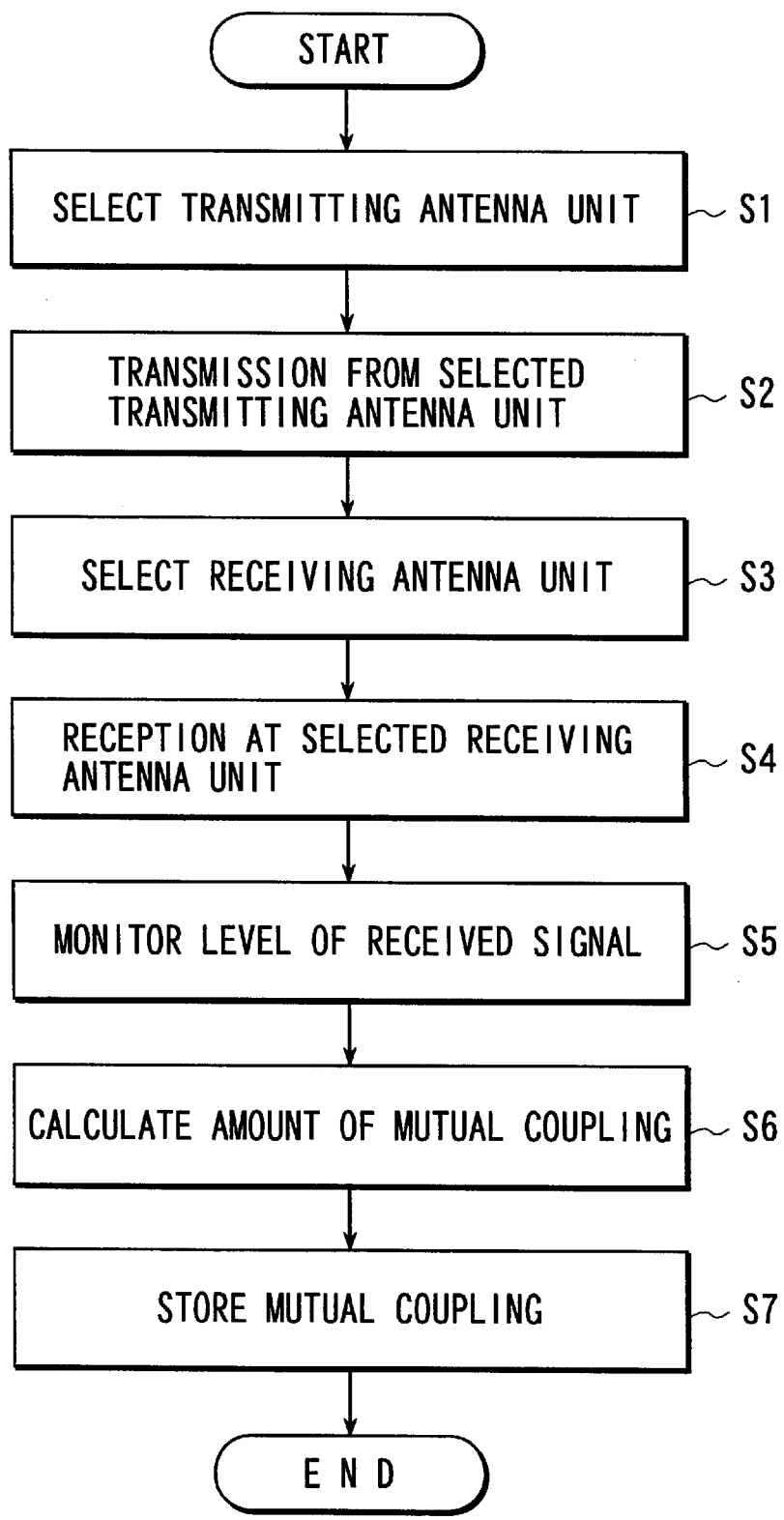
FIG. 7 is a flow chart illustrating a control procedure in the third embodiment.

In the control procedures shown in FIG. 7, the mutual coupling amounts between the antenna units are calculated from the monitor result of the reception level obtained in step S5 (step S6). This calculation can be easily performed by digital arithmetic operations. The mutual coupling amounts are stored in a memory (step S7).

For example, if the number of antenna units for transmission is only one, the mutual coupling amounts between the antenna units for transmission and the antenna units for reception are stored in the memory, as shown in FIG. 9.

In the example shown in FIG. 9, when signals are transmitted from the antenna unit B, the mutual coupling between the antenna unit B and antenna unit A is high (−10 dB) but the mutual coupling between the antenna unit B and antenna unit C is low (−30 dB). If such a condition is established that no interference occurs when the mutual coupling amount between the antenna units is −30 dB or less, it is determined that no mutual interference occurs between the antenna unit B and antenna unit C even if the same frequency is shared and that the sharing of the frequency is permitted.

On the other hand, when signals are transmitted from a plurality of antenna units at a time, the data on the antenna units for transmission, their excitation conditions (excitation amplitude and excitation phase) and the reception levels of the receiving antenna units is stored in the memory, for example, as shown in FIG. 10.

According to the data in FIG. 10, in the case where signals are transmitted from the antenna unit A and antenna unit B at the same time, if the excitation conditions of the antenna units A and B are varied from 1 to 2, the coupling amount with the antenna unit C is high (−10 dB or −8 dB) is high but the coupling amount with the antenna unit D is low (−30 dB or −33 dB). It is thus understood that in the case where the antenna unit A and antenna unit B are used as transmission antennas at the same time, no mutual interference occurs even if the same frequency is shared by the antenna unit D.

According to the above procedures, the data on the coupling amounts between the antenna units and the presence/absence of mutual interference can be stored at all times. Accordingly, when actual communication is performed and frequencies and channels are assigned, the same frequency and channel can be reused for non-interfering antenna units on the basis of the stored data. Therefore, the frequencies can be used repeatedly and there is a great advantage in efficiently using frequency resource.

In another aspect, more user terminals can be accommodated in the communication system at the same time in which one centralized controller is used as a base station, and crowded communication can be relaxed.

The control procedures of the present embodiment can be modified variously. For example, the mutual coupling amounts stored in the memory can be updated periodically. Thereby, optimal frequency assignment can be performed according to the environment of electric wave propagation which varies depending on time periods.

Moreover, it is possible to choose a combination of non-interfering antenna units on the basis of actually measured mutual coupling amounts, thereby constituting an antenna group. In this case, the antenna group may comprise only one antenna unit. The condition for non-interference can be determined by examining whether the mutual coupling amount is a predetermined value or not.

With the above structure, mutual interference between the antenna units in the antenna group can be prevented. In this case, even if the excitation conditions for the antenna units of the antenna group are varied, no interference occurs between the antenna units of the group.

Accordingly, the unit, to which the same frequency is assigned, can be used as the antenna group. As regards the antenna group, the synthesis directivity can be controlled under the excitation conditions. Thus, the beam is not merely radiated within the area, but such a pattern can also be formed, that the gain increases in a specific direction or a null forms in a direction of interfering waves. Therefore, the quality of communication links between the terminals and the antenna units can be enhanced.

(Fourth Embodiment)

A fourth embodiment of the present invention will now be described.

According to the present embodiment, a plurality of non-interfering antenna units are found in the control procedures illustrated in the third embodiment, and the same frequency to be used is assigned to these antenna units. Thereby, the area covered by the centralized controller is divided and the rate of use of repetition of the same frequency is increased.

Figure 8:
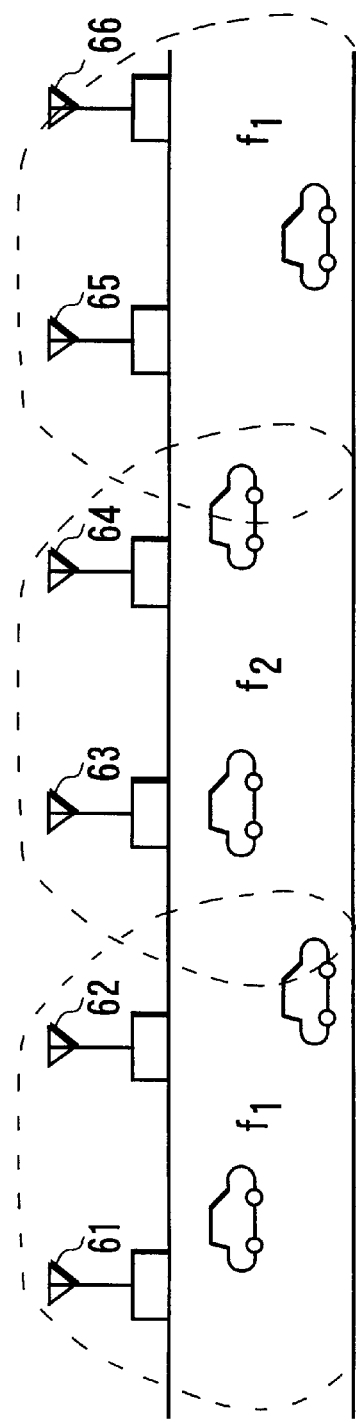
FIG. 8 schematically shows a distributed antenna system according to a fourth embodiment of the invention.

FIG. 8 shows an example of the communication system suitable for the present embodiment, wherein the present invention is applied to a radio communication system of e.g. a so-called ITS (Intelligent Transformation System) which has an object to provide drivers with useful information on a driveway such as an expressway.

In a case where a coverage area is elongated, like a driveway to which the ITS is applied, a plurality of antenna units 61 to 66 are arranged along the way, as shown in FIG. 8. The antenna units 61 and 62 constitute an antenna group A, the antenna units 63 and 64 an antenna group B, and the antenna units 65 and 66 an antenna group C.

Supposing that the antenna units of the antenna group A and those of the antenna group C do not interfere with one another, the frequency (f1) can be used for the antenna groups A and C. If the frequency is repeated in this manner along the driveway, the frequency resource can be repeated by a number of times, which corresponds to half the number of antenna groups. There is a great merit in efficiently using the frequency resource.

In the example shown in FIG. 8, the combination of antenna units of the antenna groups may be varied with the passing of time. The combination of antenna units of antenna groups may be chosen on the basis of mutual coupling amounts which are measured, when required, as described above. Alternatively, the combination may be chosen on the basis of the mutual coupling amounts stored in the memory. In this case, it is also possible to vary the area covered by the antenna groups in accordance movement of the user terminals. Thereby, a control such as hand-over is not required for the movement of user terminals, and the control is simplified.

As has been described above, the present invention has the following advantages:

(1) Necessary antenna units alone are chosen in accordance with the condition at the time of communication and beams can be efficiently formed toward user terminals such as mobile terminals. In addition, interference wave components can be suppressed. Specifically, if an unnecessary antenna is used, electric waves may be radiated in an undesired direction and a third party may be interfered with. Moreover, if a beam is formed in an undesired direction, unnecessary interference waves may be received. These problems do not arise in this invention. Excellent communication links can be maintained in the mobile communication environment in which multi-path or phasing occurs.

(2) Since a plurality of transmission beams or reception beams can be formed, many user terminals can communicate independently at the same time while the cost is limited to a minimum.

(3) The choice of antenna units and the formation of beams are performed independently for transmission and reception. Thus, in the mobile communication in which the environment of electric wave propagation varies between transmission and reception due to a difference in time and frequency between transmission and reception, the transmission beam and reception beam are controlled independently for the communication of the same terminal. Thus, communication can be performed in good condition.

(4) The transmission beam and the reception beam are formed with the same frequency. The reception level of the signal, which is transmitted from the transmitting antenna unit where the transmission beam is formed and is received by the receiving antenna unit where the reception beam is formed, is monitored. Thereby, the individual service areas of the respective antenna units can be recognized even in the condition in which the environment of electric wave propagation varies depending on time periods. Based on the recognition, the practically effective individual service areas can be set and the frequency arrangement for using the same frequency can be designed with a maximum efficiency of use. Thus, there is a great merit in efficiently using the frequency resource.

(5) On the basis of the monitored reception level, the data on the mutual coupling amounts between the transmitting antenna units and receiving antenna units is stored. When the frequencies and channels are assigned for actual communication on the basis of the stored data, the same frequency and channel are assigned to non-interfering antenna units. Thus, the frequencies can be used repeatedly and there is a greater advantage in efficiently using the frequency resource.

In another aspect, more user terminals can be accommodated in the communication system in which one centralized controller is used at the same time as a base station, and crowded communication can be relaxed. In this case, if the mutual coupling amounts stored in the memory is updated periodically, optimal frequency assignment can be performed according to the environment of electric wave propagation which varies depending on time periods.

(6) At least one antenna unit, in which the mutual coupling amount is a predetermined value or less, is chosen as each of the transmitting antenna unit and receiving antenna unit, and a plurality of antenna groups are formed. Thereby, the antenna groups can be controlled independently, and coupling between antenna groups can be reduced. If each antenna group is operated at the same frequency, different beams can be formed at the same frequency and isolation between beams can be ensured.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distributed antenna system comprising:
   a plurality of antennas arranged in a distributed manner such that individual service areas partly overlap one another; and
   a centralized controller configured to control said plurality of antennas,
   wherein said centralized controller comprises:
   a first selection circuit configured to select at least one of the plurality of antennas;
   a transmission beam forming circuit configured to form transmission beams by adaptively setting desired excitation conditions for the at least one of the plurality of antennas selected by the first selection circuit;
   a second selection circuit configured to select at least one of the plurality of antennas;
   a reception beam forming circuit configured to form reception beams by adaptively setting desired excitation conditions for the at least one of the plurality of antennas selected by the second selection circuit; and
   a monitor section configured to activate the transmission beam forming circuit and the reception beam forming circuit at same frequency, and to monitor a reception level of a signal transmitted from the at least one of the plurality of antennas selected by the first selection circuit, the signal being received by the at least one of the plurality of antennas selected by the second selection circuit.

2. The distributed antenna system according to claim 1, further comprising:
   a first section configured to find a mutual coupling amount between the at least one of the plurality of antennas selected by the first selection circuit and the at least one of the plurality of antennas selected by the second selection circuit on the basis of the reception level monitored by the monitor section; and
   a second section configured to store the mutual coupling amount found by the first section.

3. The distributed antenna system according to claim 2, further comprising:
   a third section configured to update the mutual coupling amount stored.

4. The distributed antenna system according to claim 3, wherein the mutual coupling amount stored is updated at a predetermined period.

5. The distributed antenna system according to claim 2, wherein each of said first and second selection circuits selects at least one of said plurality of antennas in which the mutual coupling amount is less than a predetermined value, thereby forming a plurality of antenna groups.

6. The distributed antenna system according to claim 5, wherein said antenna groups operate at same frequency.

7. The distributed antenna system according to claim 1, wherein said centralized controller and said plurality of antennas are connected by means of optical fibers.

8. A method of controlling a distributed antenna system comprising the steps of:
   selecting at least one of a plurality of antennas by a first selection circuit, the plurality of antennas being arranged in a distributed manner such that individual service areas partly overlap one another;
   forming a transmission beam by setting desired excitation conditions for the at least one of the plurality of antennas selected by the first selection circuit;
   selecting at least one of the plurality of antennas by a second selection circuit;
   forming a reception beam by setting desired excitation conditions for the at least one of the plurality of antennas selected by the second selection circuit; and monitoring a reception level of the transmission beam received by the at least one of the plurality of antennas in which the reception beam is formed.

9. The method according to claim 8, further comprising the steps of:

finding a mutual coupling amount between the at least one of the plurality of antennas selected by the first selection circuit and the at least one of the plurality of antennas selected by the second selection circuit on the basis of the reception level monitored; and storing the found mutual coupling amount.

10. The method according to claim 9, further comprising a step of updating the mutual coupling amount stored.

11. The method according to claim 10, wherein the mutual coupling amount stored is updated at a predetermined period.

12. The method according to claim 8, wherein each of said first and second selection circuits selects at least one of said plurality of antennas in which the mutual coupling amount is less than a predetermined value, thereby forming a plurality of antenna groups.

13. The method according to claim 12, wherein said plurality of antenna groups operate at same frequency.

* * * * *